(12) United States Patent
Whitted

(10) Patent No.: US 8,547,345 B2
(45) Date of Patent: Oct. 1, 2013

(54) TOUCH SENSITIVE LCD PANEL

(75) Inventor: J. Turner Whitted, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 12/434,689

(22) Filed: May 4, 2009

(65) Prior Publication Data

US 2010/0277423 A1     Nov. 4, 2010

(51) Int. Cl.
*G06F 3/041* (2006.01)
(52) U.S. Cl.
USPC .......................................... 345/173; 345/179
(58) Field of Classification Search
USPC ................................................. 345/156–182
See application file for complete search history.

(56) References Cited

U.S. PATENT DOCUMENTS

| | | | |
|---|---|---|---|
| 5,798,756 A * | 8/1998 | Yoshida et al. ............... | 345/179 |
| 5,982,352 A | 11/1999 | Pryor | |
| 6,262,718 B1 | 7/2001 | Findlay et al. | |
| 7,084,859 B1 | 8/2006 | Pryor | |
| 2002/0163509 A1 | 11/2002 | Roberts | |
| 2006/0207806 A1 | 9/2006 | Philipp | |
| 2007/0052690 A1 | 3/2007 | Roberts | |
| 2007/0262966 A1 * | 11/2007 | Nishimura et al. ........... | 345/173 |
| 2008/0062140 A1 * | 3/2008 | Hotelling et al. ............. | 345/173 |
| 2008/0150909 A1 * | 6/2008 | North et al. ................... | 345/173 |
| 2008/0284925 A1 | 11/2008 | Han | |

OTHER PUBLICATIONS

Kjeldsen, et al., "Dynamically Reconfigurable Vision-Based User Interfaces", Retrieved at <<http://www.research.ibm.com/ed/publications/icvs03.pdf>>, pp. 10.

Fernandez, et al., "Dynamic Modeling of Liquid Crystal Display Cells Using a Constant Charge Approach", Retrieved at <<http://ieeexplore.ieee.org/stamp/stamp.jsp?arnumber=00996212>>, IEEE Transactions on Magnetics, vol. 38, No. 2, Mar. 2002, pp. 821-824.

Hara, et al., "An Image Sensor using Photo-Leakage Current and Feed-through Voltage of Amorphous Si Thin-Film Transistors", Retrieved at <<http://www.electrochem.org/meetings/scheduler/abstracts/214/2327.pdf>>, p. 1.

* cited by examiner

*Primary Examiner* — Kevin M Nguyen
*Assistant Examiner* — Kenneth B Lee, Jr.
(74) *Attorney, Agent, or Firm* — Medley, Behrens & Lewis, LLC

(57) ABSTRACT

Described herein is a liquid crystal display apparatus that includes a liquid crystal display panel. The liquid crystal display panel includes a receiver component that receives a sensed parameter of a column line in the liquid crystal display apparatus, wherein electrical voltage is transmitted along the column line and directed at a particular sub-pixel. An output component outputs an indication that a member is in physical contact with the display panel based at least in part upon the received sensed parameter of the column line.

20 Claims, 8 Drawing Sheets

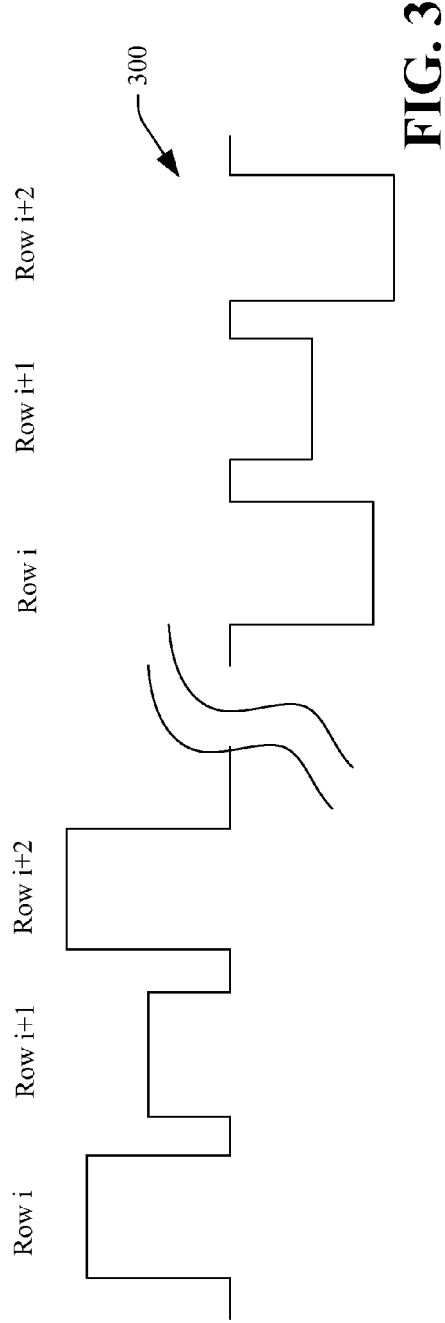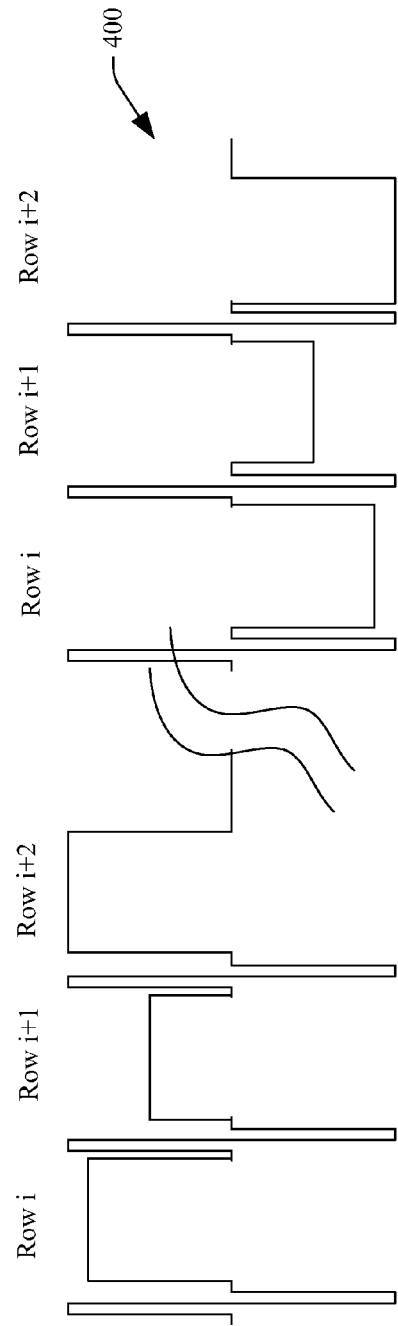

TOUCH SENSITIVE LCD PANEL

BACKGROUND

Liquid crystal display (LCD) panels have, over the recent past, evolved from relatively simple display devices that include an electrode for each pixel, to complex display technologies that use active or passive matrix technology to display color images in high definition. For example, early LCD devices can be found in digital watches, wherein each pixel is shaped based upon size and shape of an electrode that provides current to such pixel. More modern LCD technologies which can be found in relatively large television sets and computer monitors use active matrix technologies to allow images to be displayed on a display panel with great clarity.

Some LCD display panels (and display panels associated with other technologies) have been adapted to be used as touch sensitive display devices. In other words, a display apparatus can include technology that allows a determination to be made that a member or members is in physical contact with the display screen at particular locations. Thus, an individual may interact with the display screen directly through use of fingers, a stylus, etc.

Conventionally, manufacturing an LCD panel to have touch sensitive capabilities has been a relatively expensive endeavour. For example, to generate a touch sensitive LCD based upon the property of electrical resistance, additional resistive layers must be added to the display surface. In another example, the display panel may be coated with a material such as indium tin oxide which can conduct a continuous electrical current across a sensor pertaining to the display panel. In still yet another example, optical sensors may be embedded in the LCD panel. Each of these approaches, however, is relatively expensive and may cause the display to have a reduction in clarity.

SUMMARY

The following is a brief summary of subject matter that is described in greater detail herein. This summary is not intended to be limiting as to the scope of the claims.

Described herein are various technologies pertaining to liquid crystal display (LCD) panels in general and more particularly to configuring a LCD panel to have touch sensitive capabilities. An example LCD panel may be an active matrix LCD panel that includes a plurality of liquid crystal elements. For instance, each element may correspond to a sub-pixel. The example LCD panel may also include column lines that are used to provide electrical charge to certain liquid crystal elements. A sensor can be placed in series on each column line, in parallel with respect to each column line, or in series on or in parallel with a subset of column lines in the LCD panel. For instance, a sensor can be placed in parallel with a column line, wherein the sensor can be configured to output a certain parameter as it pertains to a particular liquid crystal element. For example, the sensor may be configured to sense voltage on the column line when electrical charge is being provided to a sub-pixel in the LCD panel. In another example, the sensor may be configured to sense impedance of the column line when electrical charge is being provided to the sub-pixel in the LCD panel. In still yet another example, a current sensor can be placed in series on the column line, and can be configured to output current values when electrical charge is being provided to the sub-pixel in the LCD panel.

A value output by the sensor when the particular sub-pixel is being addressed can be compared with an expected value. In an example, a table can be generated during a calibration procedure, wherein the table includes expected current values for differing amounts of voltage provided to a sub-pixel. When a certain voltage is provided to the sub-pixel, the value output by the sensor can be compared to an expected current value for such sub-pixel given the certain voltage. If the expected value and value output by the sensor are found to have differed by a threshold amount, a determination can be made that a member is in physical contact with the display panel at a location that corresponds to the sub-pixel.

In another example, a column driver can be configured to transmit successive spikes of voltage with opposing polarities to a particular sub-pixel (via a column line when) a row corresponding to the sub-pixel is addressed. The sensor in parallel and/or series with the column line can be configured to output measurements pertaining to at least one parameter during a time period that the voltage spikes are transmitted to the sub-pixel.

In operation, an individual can interact with the LCD panel directly by touching the LCD panel with a finger, a stylus or other suitable device. A determination can be made that at least one member is in physical contact with the LCD panel based at least in part upon values for the parameter output by the above described sensor. The contact of the member with LCD display panel can be provided as input to an application executing in connection with the LCD panel.

Other aspects will be appreciated upon reading and understanding the attached figures and description.

BRIEF DESCRIPTION OF THE DRAWINGS

FIGS. 3 and 4 are timing diagrams illustrating the provision of voltage to different rows of an LCD panel.

DETAILED DESCRIPTION

Figure 1:
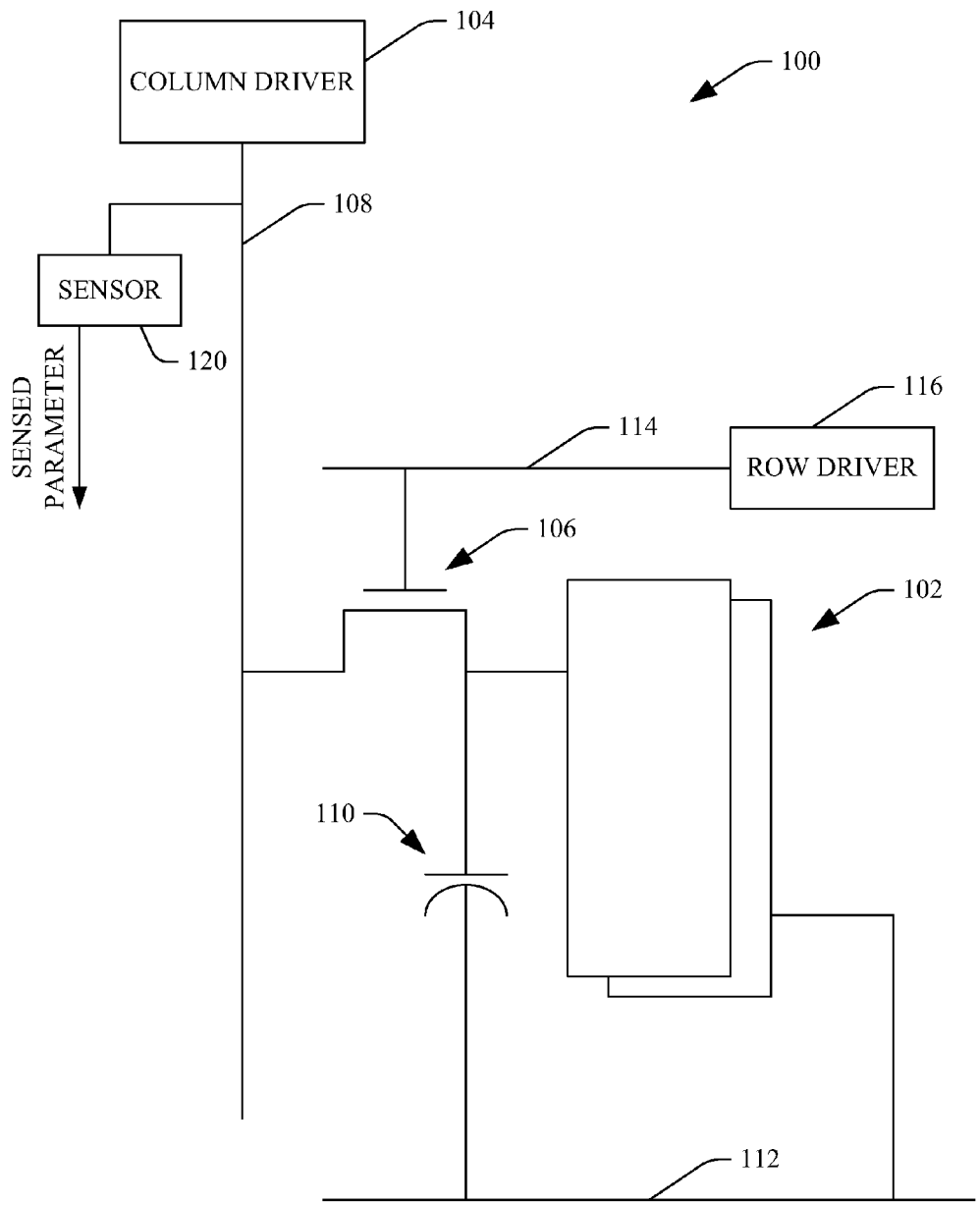
FIG. 1 is a schematic diagram of an example sub-pixel and LCD panel.

Various technologies pertaining to touch sensitive liquid crystal display (LCD) panels will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 (shown as a schematic diagram) that facilitates determining that a member (e.g., a finger or stylus) is in physical contact with an LCD panel and further determines a location where on the LCD panel the member is in physical contact with the LCD panel illustrated. The system 100 includes conducting layers 102 which sandwich a liquid crystal element for a particular sub-pixel. The liquid crystal element may be any suitable liquid crystal element that can be used in an LCD display panel.

A column driver 104 is configured to provide a particular amount of electrical charge to the conducting layers 102 (and corresponding liquid crystal element). For instance, the column driver 104 may output a particular amount of voltage based at least in part upon a desired amount of color emitted onto a display screen by way of the LCD element. The column driver 104 may be an integrated circuit or part of an integrated circuit that operates in response to receipt of data from a processor/graphics processor (not shown).

A transistor 106 (e.g., a thin film transistor) is used in connection with selectively providing charge to the conductive layers 102 and the liquid crystal element associated therewith. A column line 108 electrically couples the column driver 104 with the conducting layers 102 and corresponding liquid crystal element by way of the source of the transistor 106. A storage capacitor 110 may be electrically coupled with the drain of the transistor 106 to augment capacitance of the conductive layers 102 and corresponding liquid crystal element. As shown, the capacitor 110 can be placed in parallel with the conducting layers 102 and corresponding liquid crystal element. A common voltage line 112 can be used in connection with grounding the capacitor 110 and the conducting layers 102. Pursuant to an example, the line 112 may be an adjacent gate line for another row of sub-pixels. In another example, the line 112 may be a specially inserted line with a common voltage.

A row line 114 may be in electrical connection with the gate of the transistor 106. A row driver 116 can provide pulses on the row line 114. When a pulse is applied along the row line 114 by the row driver 116 and the column driver 104 outputs voltages to be transmitted along the column line 108, the transistor 106 can be turned on, thereby causing charge to be applied to the capacitor 110 and the conducting layers 102.

A sensor 120 may be placed in parallel with the column line 108 and may be configured to output data corresponding to at least one parameter pertaining to the column line 108. For example, the sensor 120 may be configured to sense voltage existent on the column line 108, impedance of the column line 108, reflected voltage existent on the column line 108, etc. In a specific example, the sensor 120 may be configured to output a value that is indicative of capacitance of the column line 108 when the column driver 104 applies voltage that is to be used in connection with charging the capacitor 110 and the conducting layers 102. As the sensor 120 is in parallel with the capacitor 110 and the conducting layers 102 in the corresponding liquid crystal element, the sensor 120 can sense, for instance, capacitance existent on the capacitor 110 and the conducting layers 102. Data output by the sensor 120 can be used to ascertain whether a member is in physical contact with an LCD panel at a location corresponding to the sub-pixel represented by the system 100. Specifically, data output by the sensor 120 can be used to ascertain whether a member is in physical contact with the LCD panel at a region proximate to the conducting layers 102 and corresponding liquid crystal element.

While the sensor 120 is shown as being in parallel with the column line 108, it is to be understood that in some embodiments the sensor 120 can be placed in series with the column line 108. For example, the sensor 120 in series with the column line 108 can be configured to output data pertaining to current existent on the column line 108, impedance of the column line 108, etc. Furthermore, while the sensor 120 is shown as being outside the column driver 104, it is to be understood that the sensor 120 can be embedded in the column driver 104.

An LCD panel may include a plurality of systems such as the system 100 depicted in FIG. 1. For instance, a plurality of liquid crystal elements and associated conducting layers may be electrically coupled to the row line 114. Additionally, an LCD panel may include multiple row lines and multiple column lines such as to create an active matrix LCD arrangement in the LCD panel. To provide an appropriate charge to the liquid crystal element, the column driver 104 outputs a desired voltage and such voltage is transmitted along the column line 108. The row driver 116 generates a pulse along the gate line 114 to turn the transistor 106 to an on position, thereby allowing voltage output by the column driver 104 to be applied to the capacitor 110 and the conductive layers 102 and corresponding liquid crystal element. As can be understood, the capacitor 110 is used in connection with maintaining the charge applied by the column driver 104 to the liquid crystal element. Thus, a horizontal row of image data can be represented as voltages or currents placed substantially simultaneously on a plurality of column lines. The voltages on these lines may be applied to sub-pixels in a row by pulsing the gate line for each row of the display. Pursuant to an example, width of a pulse may be approximately the image frame rate divided by a number of rows in the LCD panel.

While charge is transferred to each sub-pixel through a transistor, such as a TFT transistor, can be fixed for a given applied voltage, the voltage across the conductive layers 102 and corresponding liquid crystal element may not be constant over a frame time due to variation in capacitance of the conducting layers as the conducting layers respond to the applied voltage. A capacitor such as the storage capacitor 110 may be used to augment the conducting layers 102 to aid in connection with the cell maintaining constant voltage even when the capacitance corresponding to the conducting layers 102 and corresponding liquid crystal element increases during the interval in which the transistor 106 is turned off.

When a member comes into physical contact with the LCD panel at a location corresponding to a particular sub-pixel, capacitance at such sub-pixel (e.g., at conducting layers and liquid crystal elements) may alter from capacitance experienced under normal operating conditions. Therefore, a comparison between current or other suitable parameter output by the sensor 120 for at least a portion of one frame can be compared with expected current values for such sub-pixel to determine whether or not a member is in physical contact with the LCD panel at the location corresponding to the sub-pixel. In an example embodiment, a table can be generated that includes current values expected on the column line 108 for a plurality of sub-pixels given different applied voltages. Values of such table can be compared with values output by the sensor 120 for corresponding applied voltages. In another example embodiment, the column driver 104 can be configured to output successive voltage spikes of opposing polarities during a portion of a frame. Use of voltage spikes of opposing polarities can maintain image integrity. The sensor 120 can be configured to output values pertaining to a parameter of the column line 108 while such voltage spikes are transmitted down the column line 108. These parameter values can be compared with expected parameter values for such voltage spikes of opposing polarities.

In an example embodiment, a sensor such as a sensor 120 can be placed on each column line in the LCD panel. Thus, output from sensors can be obtained for each pixel and/or sub-pixel in an LCD panel. In another example, sensors may be positioned on a subset of column lines in the LCD panel (e.g., one of every five column lines, one of every ten column lines, etc.).

Figure 2:
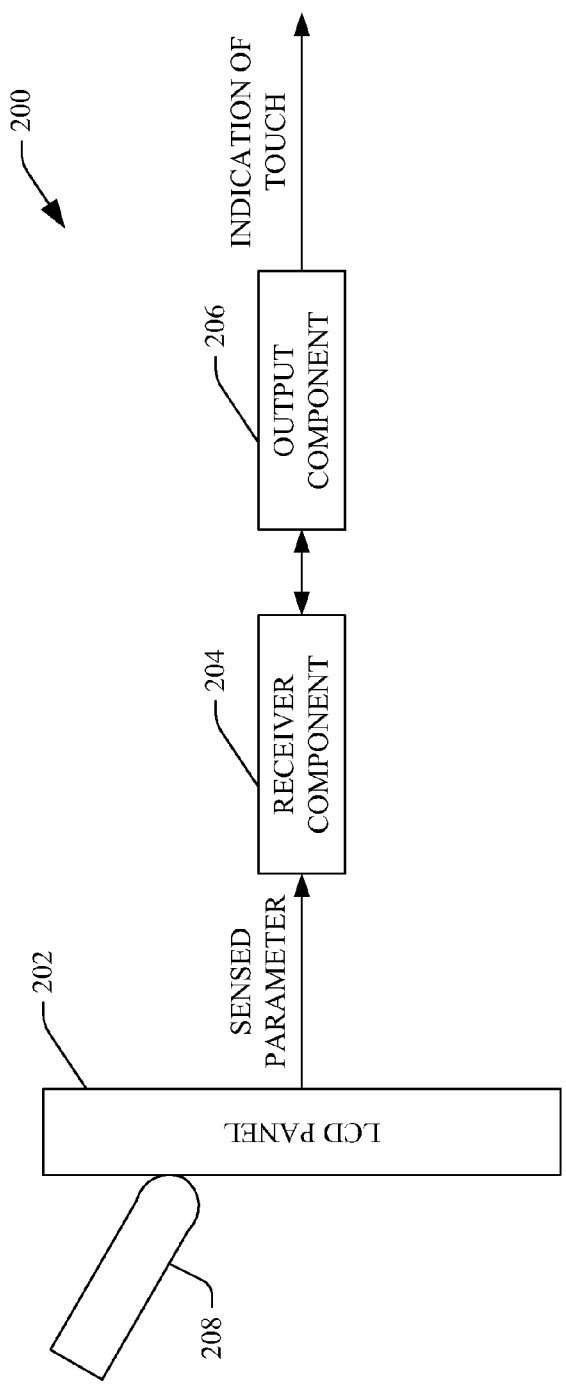
FIG. 2 is a functional block diagram of an example system that facilitates determining that a member is in physical contact with a certain location of an LCD display.

Referring now to FIG. 2, an example apparatus 200 is illustrated. The LCD apparatus 200 includes a LCD panel 202. For instance, the LCD panel 202 can be an active matrix LCD panel that comprises sub-pixels such as those depicted in FIG. 1. The LCD apparatus 200 also includes a receiver component 204 that receives a sensed parameter with respect to a column line in the LCD panel 202. As noted above, voltage is transmitted down the column line and provided to a particular sub-pixel through use of a transistor. In an example, the sensed parameter may be one of current, impedance, reflected voltage, capacitance or some other suitable parameter. As shown and described above, the sensed parameter may be output by a sensor that is placed in parallel with a liquid crystal element and conducting layers corresponding thereto (e.g., placed on a column line or in parallel thereto).

The LCD apparatus 200 may also include an output component 206 that is in communication with the receiver component 204. The output component 206 can output an indication that a member 208 is in physical contact with the LCD panel 202 based at least in part upon the received parameter from the sensor positioned in parallel to the column line (or in series with the column line). For instance, the member 208 may be a human finger, a stylus or other suitable member.

As alluded to above, the output component 206 may have access to expected parameter values when a member is not in physical contact with the LCD panel 202. When the member 208 comes into physical contact with the LCD panel 202 at a location corresponding to a sub-pixel that is provided with voltage by a column driver, such contact can cause the parameter value to be different when compared to the parameter value when the member 208 is not in physical contact with the LCD panel 202. The output component 206 can determine such difference and, based at least in part upon the difference, can determine that the member 208 is in physical contact with the LCD panel 202 at the location subject to sensing by the sensor.

It can also be noted that the system 200 supports multitouch detection. That is, the system 200 can ascertain that two different members are simultaneously in contact with the LCD panel 202 at two different locations. Specifically, the output component 206 can detect particular locations at which multiple members are in physical contact with the LCD panel 202. Furthermore, since the output component 206 can ascertain location of physical contact of a member with the LCD panel 202 for each frame, the output component 206 can also be configured to detect particular motions undertaken by users that are interacting with the LCD panel 202. For instance, the output component 206 can determine that a user is using two members and moving them in opposing directions at a certain velocity/acceleration. Such information can be used as input to an application that supports touch-based interaction.

The LCD apparatus 200 may be or may be included in any suitable device. For instance, the LCD apparatus 200 may be or may be included in a television, a computer or computer display screen, a personal digital assistant, a portable telephone, a multimedia player, a watch or other suitable device.

Now referring to FIG. 3, an example diagram 300 that illustrates voltage pulses transmitted by a column driver down a column line to particular sub-pixels is illustrated. As can be ascertained, the column driver provides a first voltage pulse to an ith row of a LCD panel. Thereafter, the column driver provides a second voltage pulse of a certain amount to an i+1 row of the LCD panel and thereafter follows with a $3^{rd}$ voltage pulse to be transmitted to an i+2 row of the LCD panel. The provision of such voltage pulses can be over the course of one frame. FIG. 3 also notes voltage pulses provided by the column driver over a subsequent frame. For the second frame the column driver can apply inverted voltages to prevent deterioration of liquid crystal material in the LCD panel.

When the column driver is configured to provide voltage pulses in the manner similar to that depicted in FIG. 3, the sensor in parallel to the column line or in series with the column line can be employed to measure voltage, current, (or other parameter) during normal operation of the LCD panel. In an example, the LCD panel can be calibrated to form a table of column line current versus voltage for undistorted cells, wherein such table may be stored individually for each sub-pixel. A difference between the calibrated current and the measured current may then provide an indication that a member is in physical contact with the LCD panel.

Now referring to FIG. 4, a diagram 400 that illustrates an example manner of providing voltage pulses over a two frame interval in an LCD panel by a column driver is illustrated. It can be noted that turning on a transistor such as the transistor in FIG. 1 can provide a more or less direct path from the column driver to the pixel. While this path is only open for a brief interval, the column driver can use such interval to excite the cell with a signal that does not affect the displayed image which can be used to sense the state of the cell. Specifically, the diagram 400 illustrates addition of a narrow fixed voltage positive spike followed by a narrow fixed voltage negative spike preceding each column line charging pulse. The response sensed by the sensor shown in FIG. 1 of a column line to such narrow set of pulses can provide an indication of capacitance variation that is independent of the image signal transmitted down the column line. Since the net charge introduced by such positive and negative spike is zero, such excitation does not affect the intensity displayed on the LCD panel.

It is to be noted that neither the diagram 300 nor the diagram 400 accurately portrays actual voltages provided by the column driver with respect to response time compensation circuitry of modern column drivers. Rather, the diagrams 300 and 400 are provided to illustrate basic voltage pulses that can be provided by the column driver in connection with determining where on an LCD display a member is in physical contact therewith.

Figure 5:
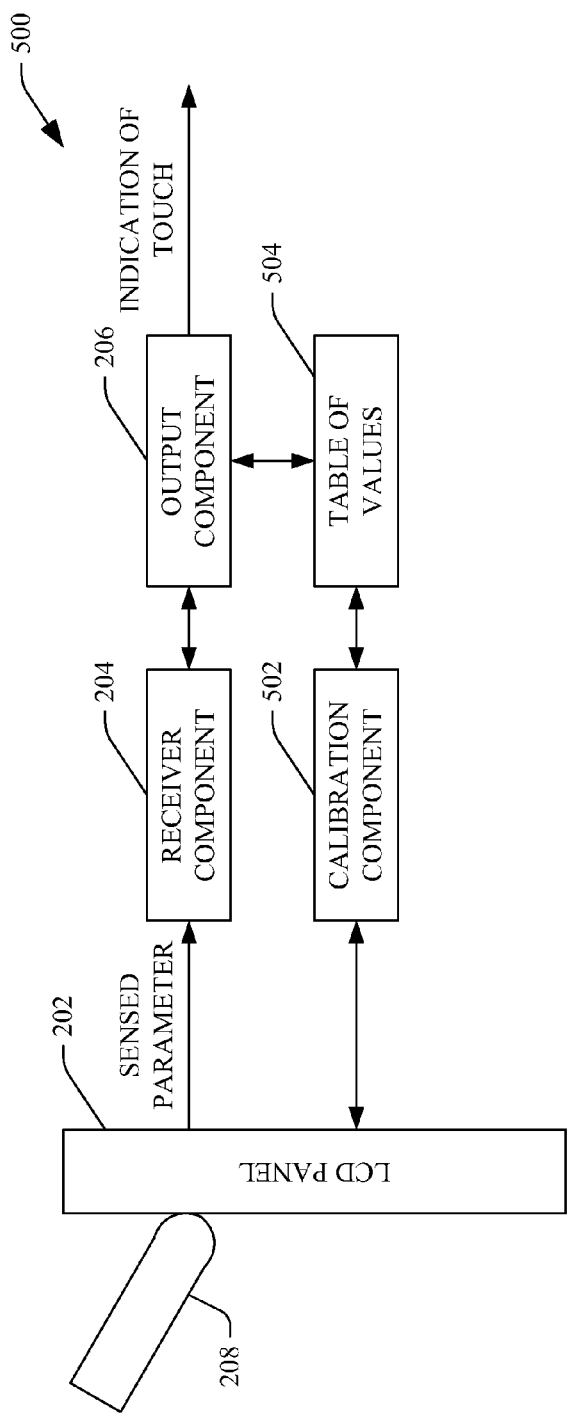
FIG. 5 is a functional block diagram of an example system that facilitates calibrating a touch sensitive LCD panel.

Now referring to FIG. 5, an example LCD apparatus 500 that includes touch sensitive functionality is illustrated. The apparatus 500 includes the LCD panel 202, which comprises a plurality of sub-pixels such as that shown in FIG. 1. The apparatus 500 further includes a calibration component 502, wherein the calibration component 502 is configured to generate a table of values 504 with respect to a parameter output by a sensor configured in parallel with a column line or in series with the column line in the LCD panel 202. In an example, the calibration component 502 can cause column drivers in the LCD panel 202 to output a plurality of possible voltage pulse values for each sub-pixel in the LCD panel 202 along the column line. A parameter may be sensed by the sensor with respect to each voltage pulse value output by the column driver. As noted above, the parameter may be current, capacitance, other suitable form of impedance, reflected voltage, etc. Therefore, the table of values 504 may include parameter values output by the sensor for a plurality of values of voltage pulses provided by the column driver down the column line.

In another example, the calibration component 502 can cause at least one column driver in the LCD panel 202 to output consecutive voltage spikes of opposing polarities to each sub-pixel on the column line. Values output by the sensors during a time period that the column driver outputs the voltage spikes can be stored in the table of values 504, wherein such table of values 504 may include values for a plurality of sub-pixels in the LCD panel.

During operation of the LCD panel 202, the receiver component 204 can receive at least one sensed parameter value from a sensor placed in parallel with a column line or in series on a column line in the LCD panel 202. The output component 206 is in communication with receiver component 204 and can receive such sensed parameter from the receiver component 204. The output component 206 can perform an analysis with respect to values in the table of values 504 and the received sensed parameter and can output an indication that a member is in physical contact at a certain position in the LCD panel 202 based at least in part upon the analysis. For instance, the output component 206 can compare the sensed parameter with corresponding values in the table of values 504, and can determine that the member 208 is in physical contact with the LCD panel 202 based at least in part upon the comparisons. In the embodiment where the column driver does not introduce voltage spikes in a frame, the receiver component 204 can additionally receive an amount of voltage provided by the column driver down the column line for a particular sub-pixel. The output component 206 may then compare the voltage value for sensed parameters with the corresponding voltage value and sensed parameter in the table of values 504.

Figure 6:
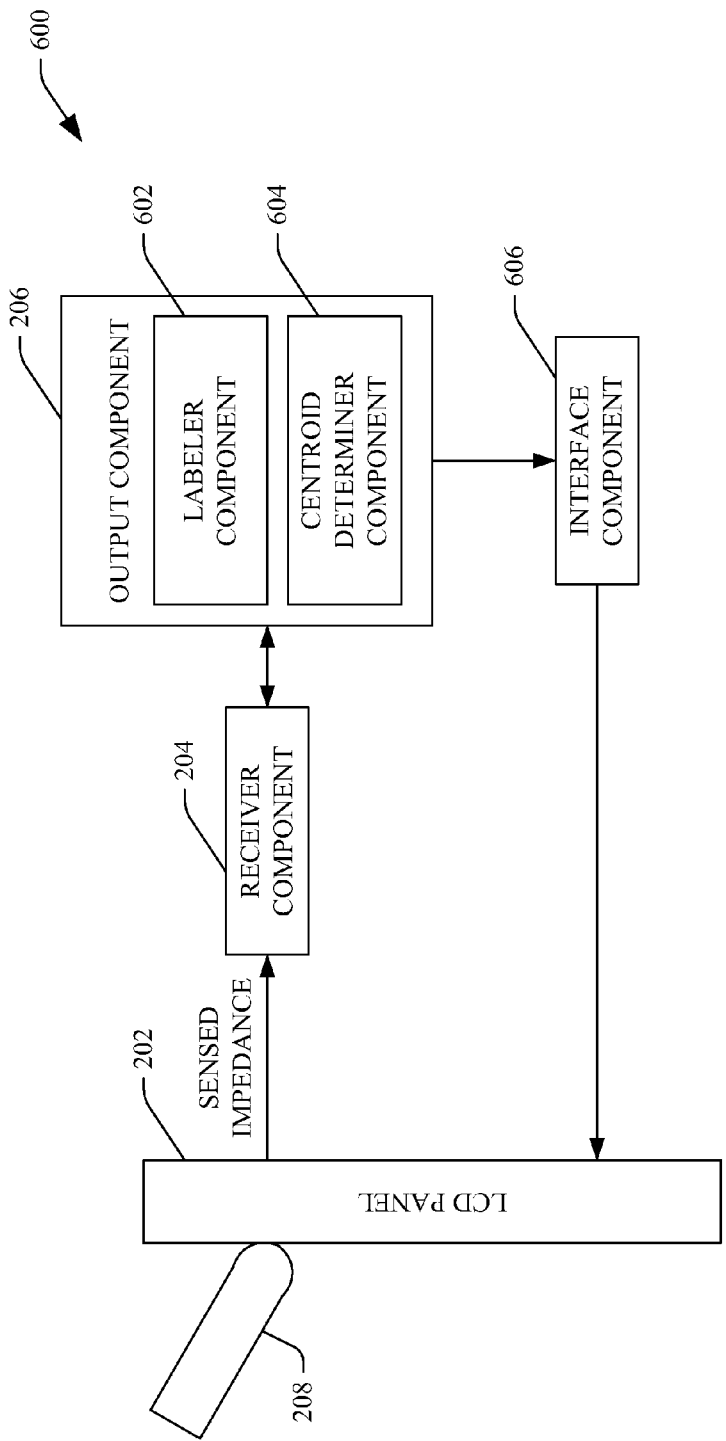
FIG. 6 is a functional block diagram of an example system that facilitates determining where on an LCD panel a member is in physical contact therewith.

With reference now to FIG. 6, an example LCD apparatus 600 is illustrated. The LCD apparatus 600 includes the receiver component 204 that receives a sensed parameter from a sensor on a column line in the LCD panel 202 as described above. The apparatus 600 also includes the output component 206, which outputs an indication that the member 208 is in physical contact with the LCD panel 202 based at least in part upon the sensed parameter value received by the receiver component 204.

The output component 206 may include a labeler component 602 that labels certain pixels or sub-pixels as being subject to contact by the member 208. The labeler component 602 can create a matrix that is indicative of which pixels correspond to where on the LCD panel 202 the member 208 is in physical contact with the LCD panel 202. For instance, the matrix can include a value for each pixel or sub-pixel in the LCD panel 202 and may include binary values that indicate whether or not the sensed parameter indicates that the member 208 is in physical contact with the LCD panel 202 at a location corresponding to a sub-pixel that is subject to sensing.

The output component 206 may additionally include a centroid determiner component 604 that determines a centroid in the matrix generated by the labeler component 602. The location of the centroid (e.g., the pixel and a threshold number of surrounding pixels) can be labeled as a location on the LCD panel 202 that the member 208 is in physical contact therewith. As noted above, the centroid determiner component 604 can act in conjunction with the labeler component 602 to determine that multiple members are simultaneously in physical contact with the LCD panel 202 at different locations on such display panel 202.

The output component 206 may further perform various filtering activities to locate and eliminate false positives. For example, the output component 206 may ensure that a threshold number of values in the matrix generated by the labeler component 602 indicate that the member 208 is in physical contact with the LCD panel 202. For instance, a single indication in the aforementioned matrix that the member 208 is in physical contact with the LCD panel 202 would be a false positive, as it is unlikely that a member may be in physical contact with a single sub-pixel. Of course, other filtering operations are contemplated and intended to fall under the scope of the hereto appended claims.

The apparatus 600 may also include an interface component 606 that receives data from the output component 206 and causes an image depicted on the LCD panel 202 to be altered. For instance, the interface component 606 can cause an application to be opened, can cause an image to be enlarged, color to be altered, etc. based at least in part upon data provided by the output component 206.

Figure 7:
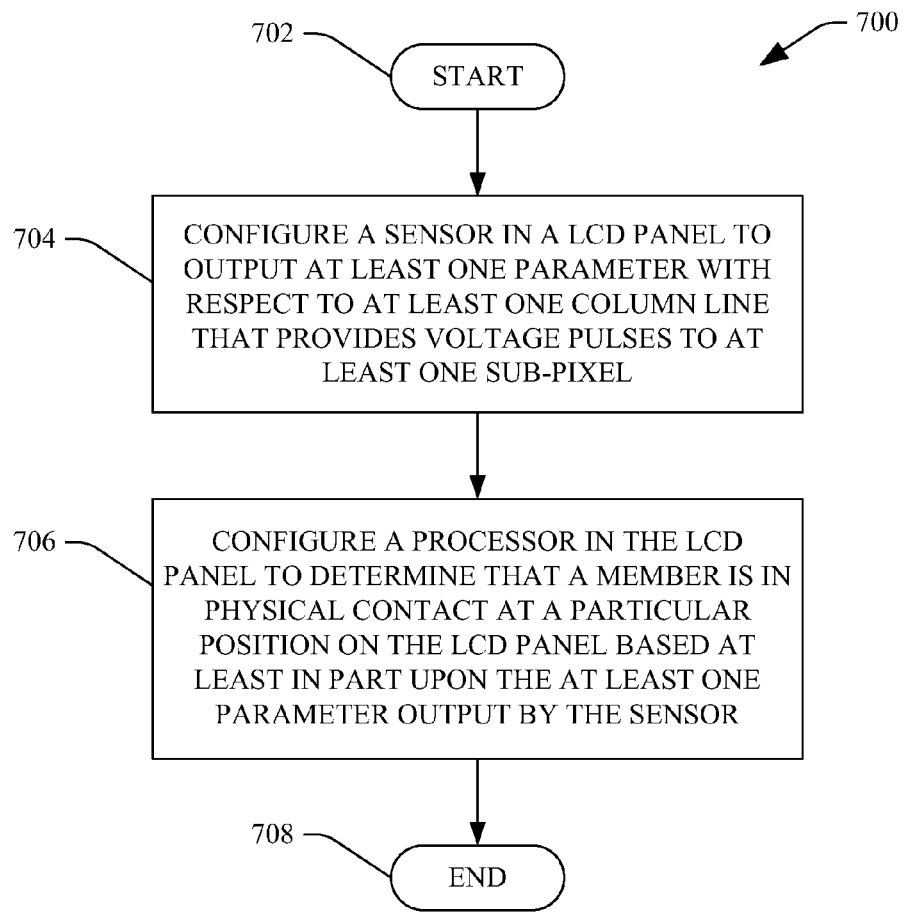
FIG. 7 is flow diagram that illustrates an example methodology for determining that a member is in physical contact at a particular location of an LCD panel.
Figure 8:
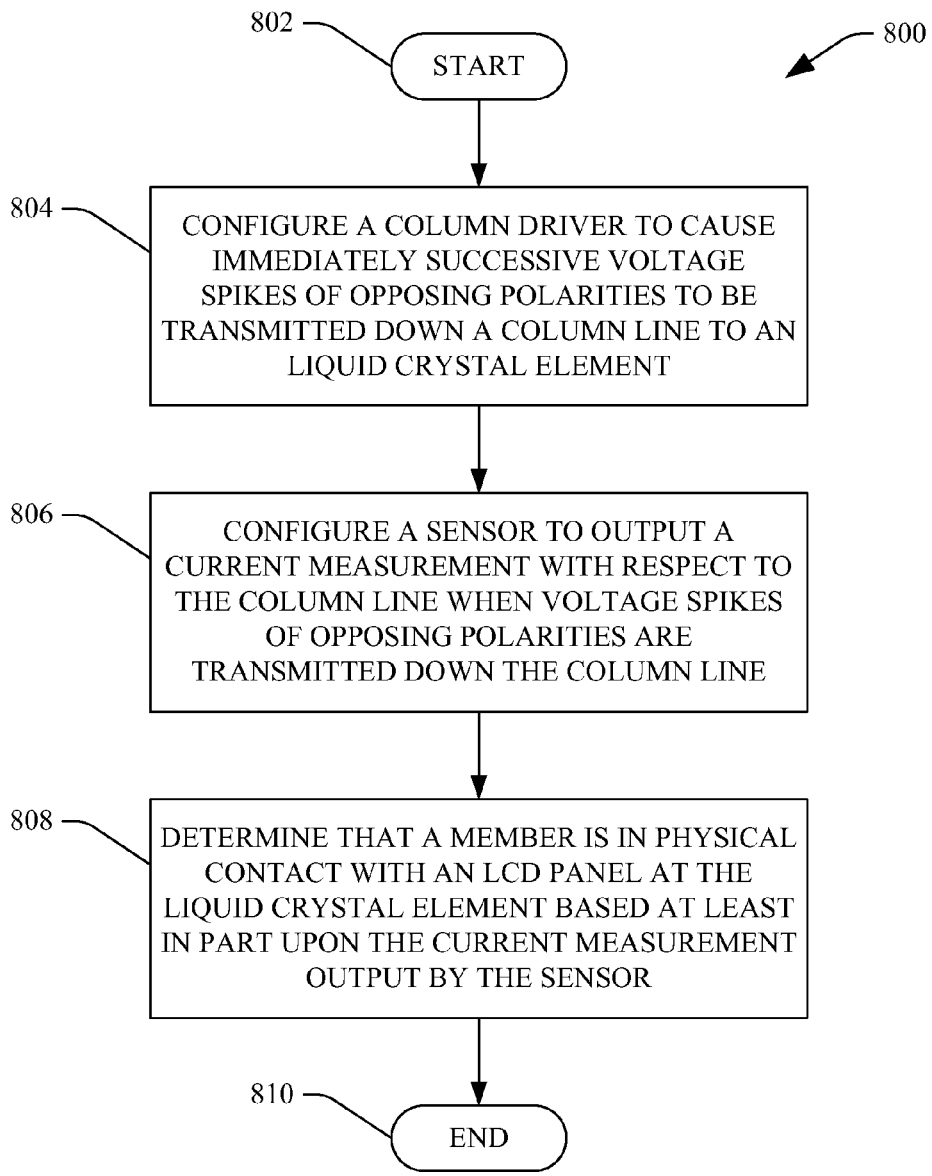
FIG. 8 is a flow diagram that illustrates an example methodology for determining that a member is in physical contact with an LCD panel at a certain location.

With reference now to FIGS. 7 and 8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 7, a methodology 700 that facilitates determining that a member is in physical contact with a LCD panel and determining location on the LCD panel of such contact is illustrated. The methodology 700 begins at 702, and at 704 a sensor in a LCD panel is configured to output values pertaining to at least one parameter with respect to at least one column line that provides voltage pulses to at least one sub-pixel. For example, the LCD panel may be in a television, a computer, a personal digital assistant, a portable telephone, a multimedia player or the like. Furthermore, the at least one parameter may be current, impedance (such as capacitance), reflected voltage, etc.

At 706, a processor in the LCD panel is configured to determine that a member, such as a finger, is in physical contact with the LCD panel at a particular position on the LCD panel based at least in part upon the at least one parameter value output by the sensor. Pursuant to an example, the sensor can be placed in parallel with the column line or in series with the column line. Moreover, the processor can be configured to detect multiple positions, where multiple members are in physical contact with the LCD panel. Furthermore, the processor can be a CPU or a GPU. The methodology 700 completes at 708.

Now referring to FIG. 8, an example methodology 800 that facilitates determining that a member is in physical contact with a LCD panel at a particular position on the LCD panel is illustrated. The methodology starts at 802, and at 804 a column driver is configured to cause immediately successive voltage spikes of opposing polarities to be transmitted down a column line to a certain liquid crystal element (sub-pixel assembly).

At 806, a sensor in series with the column line is configured to output a measurement of current with respect to the column line when the voltage spikes of opposing polarities are transmitted down the column line to the particular liquid crystal element.

At 808, a determination is made that a member is in physical contact with the LCD panel at a location corresponding to the liquid crystal element based at least in part upon the measurement of current output by the sensor. For instance, the measurement of current can be compared with expected current measurements when a member is not in physical contact with the LCD panel at a location corresponding to the liquid crystal element. If, during the comparison, the expected current value is different than the measured current value, it can be ascertained that a member is applying pressure to the LCD panel at a location corresponding to the liquid crystal element. The methodology 800 completes at 810.

Figure 9:
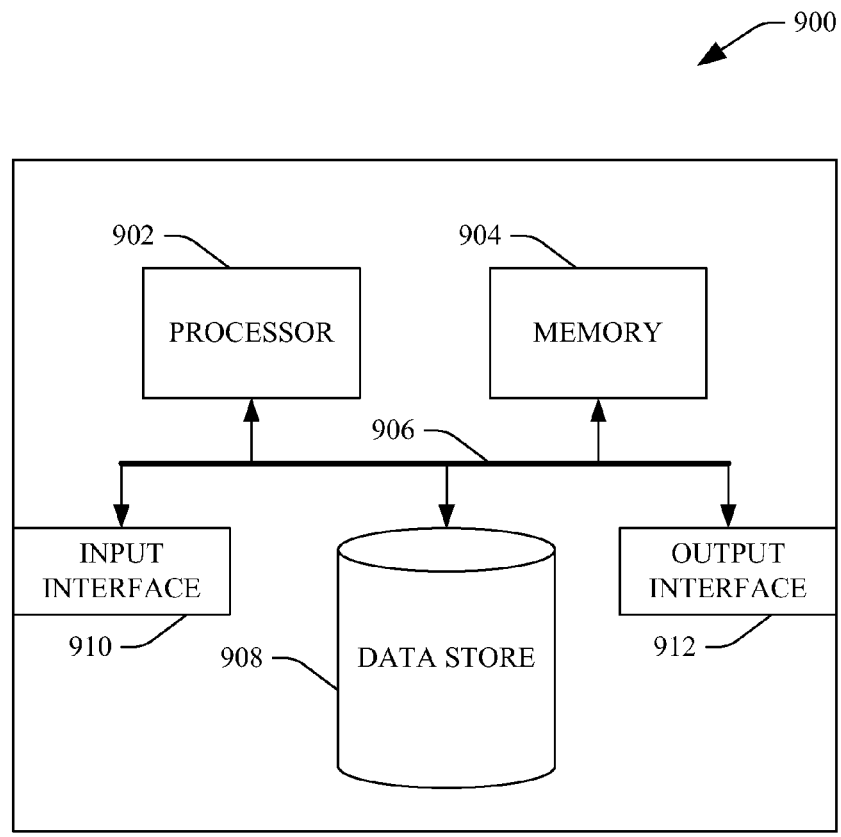
FIG. 9 is an example computing system.

Now referring to FIG. 9, a high-level illustration of an example computing device 900 that can be used in accordance with the systems and methodologies disclosed herein is illustrated. For instance, the computing device 900 may be used in a system that supports determining where on a LCD panel a member is in physical contact therewith. In another example, at least a portion of the computing device 900 may be used in a system that supports causing a column driver in a LCD panel to output immediately successive voltage pulses of opposing polarities during a frame. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store tables of voltage values and corresponding parameters of column lines.

The computing device 900 additionally includes a data store 908 that is accessible by the processor 902 by way of the system bus 906. The data store 908 may include executable instructions, image data, values of parameters, etc. The computing device 900 also includes an input interface 910 that allows external devices to communicate with the computing device 900. For instance, the input interface 910 may be used to receive instructions from an external computer device, from a user that is in physical contact with the LCD panel, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A liquid crystal display apparatus that includes a liquid crystal display panel, comprising:

a column driver that transmits electrical voltage along a column line in the liquid crystal display apparatus directed at a particular sub-pixel, wherein the column driver is configured to output at least two successive voltage spikes of opposing polarities and a charging pulse on the column line directed to the particular sub-pixel;

a sensor that is positioned electrically in parallel with the column line or in series with the column line that is configured to sense a sensed parameter when the column driver outputs the at least two successive voltage spikes on the column line;

a receiver component that receives the sensed parameter of the column line; and an output component that outputs an indication that a member is in physical contact with the display panel based at least in part upon the received sensed parameter of the column line, wherein the sensed parameter of the column line corresponds to capacitance between conducting layers of the display panel at the particular sub-pixel, wherein a liquid crystal element is between the conducting layers of the display panel at the particular sub-pixel, and wherein the member being in physical contact with the display panel at a location corresponding to the particular sub-pixel alters the capacitance between the conducting layers of the display panel at the particular sub-pixel.

2. The liquid crystal display apparatus of claim 1, wherein the sensed parameter is current on the column line when the particular sub-pixel is addressed.

3. The liquid crystal display apparatus of claim 1, wherein the sensed parameter is impedance of the column line when the particular sub-pixel is addressed.

4. The liquid crystal display apparatus of claim 1, wherein the sensed parameter is reflected voltage on the column line when the particular sub-pixel is addressed.

5. The liquid crystal display apparatus of claim 1 being a television.

6. The liquid crystal display apparatus of claim 1 being a computer.

7. The liquid crystal display apparatus of claim 1, further comprising a calibration component that is configured to generate a table of observed parameters on the column line for different voltages applied to various sub-pixels, wherein the output component outputs the indication that the member is in physical contact with the display panel based at least in part upon an analysis of the table of observed parameters with respect to the received sensed parameter of the column line.

8. The liquid crystal display apparatus of claim 1, wherein the receiver component receives sensed parameters with respect to multiple column lines, and wherein the output component outputs an indication that multiple members are simultaneously in contact with the display panel at different locations on the display panel.

9. The liquid crystal display apparatus of claim 1, wherein each column line in the display panel has a sensor corresponding thereto that is configured to sense a parameter corresponding to the column lines during operation of the liquid crystal display apparatus.

10. The liquid crystal display apparatus of claim 1, further comprising:

a labeler component that labels certain sub-pixels as being contacted by a member and creates a matrix that is indicative of which sub-pixels are contacted by the member; and a centroid determiner component that determines a centroid in the matrix of sub-pixels that are found to be contacted by the member.

11. The liquid crystal display apparatus of claim 10, further comprising an interface component that causes an interaction to occur on the liquid crystal display panel based at least in part upon a location of the centroid in the matrix.

12. A method comprising the following computer-executable acts:
configuring a column driver in a liquid crystal display panel to output at least two electrical voltage spikes of opposing polarity and a charging pulse on a column line for each frame, wherein the column line provides current to a sub-pixel in the liquid crystal display panel, wherein the at least two electrical voltage spikes of opposing polarities precede the charging pulse in each frame, and wherein an emitted color at the sub-pixel is based on voltage of the charging pulse;
configuring a sensor in a liquid crystal display panel to output a parameter with respect to the column line, wherein the sensor is configured to output the parameter with respect to the at least two electrical voltage spikes of opposing polarities; and
configuring a processor that corresponds to the liquid crystal display panel to determine that a member is in physical contact with the liquid crystal display panel at a particular position on the liquid crystal display panel corresponding to the sub-pixel based at least in part upon the parameter output by the sensor, wherein the parameter output by the sensor corresponds to capacitance between conducting layers of the liquid crystal display panel at the sub-pixel corresponding to the particular position, wherein a liquid crystal element is between the conducting layers of the liquid crystal display panel at the sub-pixel, and wherein the member being in physical contact with the liquid crystal display panel at the particular position alters the capacitance between the conducting layers of the liquid crystal display panel at the sub-pixel.

13. The method of claim 12, wherein the parameter is current on the column line.

14. The method of claim 12, wherein the parameter is impedance of the column line.

15. The method of claim 12, further comprising configuring the processor to detect that multiple members are in simultaneous contact with the liquid crystal display panel at different locations thereon.

16. The method of claim 12, further comprising:
configuring the processor to analyze the parameter output by the sensor with an expected value; and
determining that the member is in physical contact with the liquid crystal display based at least in part upon the analysis.

17. A liquid crystal display panel, comprising:
a plurality of liquid crystal elements between conducting layers;
a plurality of column lines that are configured to provide electrical charge to the plurality of liquid crystal elements;
a column driver that is configured to selectively control an amount of electrical charge to be provided to each of the plurality of liquid crystal elements by way of the corresponding plurality of column lines, wherein the column driver is additionally configured to control timing with respect to providing electrical charges to each of the plurality of liquid crystal elements by way of the column line, and wherein the column driver is configured to cause successive voltage spikes of opposing polarities and a charging pulse to be transmitted on each of the plurality of column lines during a frame; and
a plurality of sensors that are positioned electrically in parallel with the plurality of column lines, such that each of the plurality of column lines has a sensor in parallel thereto, wherein each of the plurality of sensors is configured to detect voltage on the column line and output a value indicative of capacitance between the conducting layers.

18. The liquid crystal display apparatus of claim 1, wherein the at least two electrical voltage spikes of opposing polarities precede the charging pulse in a given frame.

19. The liquid crystal display apparatus of claim 1, wherein an emitted color at the sub-pixel is based on voltage of the charging pulse.

20. The liquid crystal display apparatus of claim 1, wherein the at least two successive voltage spikes of opposing polarities have fixed voltages.

* * * * *